US012661929B2

(12) United States Patent
Kienreich et al.

(10) Patent No.: US 12,661,929 B2
(45) Date of Patent: Jun. 23, 2026

(54) TRACK ROLLER ASSEMBLY

(71) Applicant: Faigle Kunststoffe GmbH, Hard (AT)

(72) Inventors: Tobias Kienreich, Hörbranz (AT);
Laurin Greussing, Alberschwende (AT)

(73) Assignee: Faigle Kunststoffe GmbH, Hard (AT)

( * ) Notice: Subject to any disclaimer, the term of this patent is extended or adjusted under 35 U.S.C. 154(b) by 6 days.

(21) Appl. No.: 18/895,680

(22) Filed: Sep. 25, 2024

(65) Prior Publication Data

US 2025/0108661 A1      Apr. 3, 2025

(30) Foreign Application Priority Data

Sep. 28, 2023    (AT) .................................. A 110/2023

(51) Int. Cl.
    B60B 33/00          (2006.01)
    B60B 33/04          (2006.01)
(52) U.S. Cl.
    CPC ........ B60B 33/0044 (2013.01); B60B 33/045 (2013.01)
(58) Field of Classification Search
    CPC ... B60B 33/002; B60B 33/00; B60B 33/0028; B60B 33/0039; B60B 33/0044; B60B 33/0047; B60B 33/0057; B60B 33/045; B60B 33/0063; B60B 9/06; B60B 9/005; B60B 2900/1331; B60B 33/0002; B60B 33/0049; B60B 33/0068; B60B 33/0073; B60B 33/0081; B60B 2200/20; B60B 2360/00; B60B 2380/12; B60B 2900/571;

B60B 2900/572; B60B 7/0013; B60B 33/0036; B60G 11/00; B60G 11/14; B60G 11/15; B60G 11/16; B60G 11/006; B60G 3/01; A45C 5/14; A45C 2005/148; B25J 7/007; B25J 11/008
See application file for complete search history.

(56) References Cited

U.S. PATENT DOCUMENTS

| | | | |
|---|---|---|---|
| 409,495 A | 8/1889 | Pederson | |
| 3,818,541 A | 6/1974 | Daniels | |
| 5,568,671 A * | 10/1996 | Harris | B60B 33/0002 16/37 |

(Continued)

FOREIGN PATENT DOCUMENTS

| | | |
|---|---|---|
| AT | 520732 B1 | 7/2019 |
| AT | 524624 B1 | 9/2023 |

(Continued)

*Primary Examiner* — Chuck Y Mah
(74) *Attorney, Agent, or Firm* — Volpe Koenig

(57) ABSTRACT

A track roller assembly (1) having a track roller (2) and a track roller suspension (3), the track roller (2) having a track roller axle body (4) and a track roller body (5) having a track roller axle receptacle opening (6), and the track roller body (5) being rotatably mounted on the track roller axle body (4) which is guided through the track roller axle receptacle opening (6). The track roller axle body (4) is mounted in insertion channels (9, 10) of the track roller suspension (3) while using at least two elastic damping members (7, 8) disposed therebetween. The track roller axle body (4) in a fastening position is fastened in a clamping manner in the insertion channels (9, 10) of the track roller suspension (3) by the damping members (7, 8).

10 Claims, 5 Drawing Sheets

(56)                    References Cited

U.S. PATENT DOCUMENTS

| | | | |
|---|---|---|---|
| 6,332,240 B1 * | 12/2001 | Wu | B60B 33/0028 16/18 CG |
| 8,407,856 B2 | 4/2013 | Frame | |
| 8,764,120 B2 * | 7/2014 | Scicluna | B60B 7/04 301/37.26 |
| 9,027,204 B2 * | 5/2015 | Frame | B60B 33/0044 16/35 R |
| 10,829,133 B2 * | 11/2020 | Kienreich | B65G 39/02 |
| 11,338,616 B1 * | 5/2022 | Fitzhugh | B60B 7/0013 |
| 2004/0221423 A1 * | 11/2004 | Tsai | A47C 7/006 16/30 |
| 2008/0179940 A1 * | 7/2008 | Hill | B60C 7/22 301/105.1 |
| 2009/0260181 A1 | 10/2009 | Jones et al. | |
| 2014/0144754 A1 | 5/2014 | Miller et al. | |
| 2019/0039412 A1 * | 2/2019 | Tang | B60B 33/0042 |
| 2022/0194439 A1 | 6/2022 | Kienreich | |

FOREIGN PATENT DOCUMENTS

| | | |
|---|---|---|
| CN | 211617315 U | 10/2020 |
| DE | 2937571 A1 | 4/1981 |
| DE | 3148961 C2 | 7/1989 |
| EP | 2625048 B1 | 6/2015 |
| WO | 2011078468 A2 | 6/2011 |

* cited by examiner

TRACK ROLLER ASSEMBLY

This application claims priority from Austrian Patent Application No. A110/2023, filed Sep. 28, 2023, which is incorporated herein by reference as if fully set forth.

TECHNICAL FIELD

The present invention relates to a track roller assembly comprising a track roller and a track roller suspension, the track roller having a track roller axle body and a track roller body having a track roller axle receptacle opening, and the track roller body being rotatably mounted on the track roller axle body which is guided through the track roller axle receptacle opening, the track roller axle body being mounted in insertion channels of the track roller suspension while using at least two elastic damping members disposed therebetween.

BACKGROUND

Track roller assemblies for conveyor installations, in particular for transport carts for high-stack storage for piece goods are known from the prior art, for example from AT 520732 A4. Such floor-bound rail-guided transport carts are also referred to as shuttles or transfer carts.

Track roller assemblies of this type have at least one, in most instances fork-shaped, track roller suspension and a track roller having a track roller body as well as a track roller axle body. At least one damping member can additionally be provided for damping. Moreover provided in the generic type of AT 520732 A4 is in each case one clip disposed laterally next to the damping member in order to releasably connect the track roller to the track roller suspension.

In the prior art it is disadvantageous that many individual parts of a damped track roller assembly are required and mechanical weak spots and/or many wear surfaces are associated therewith.

SUMMARY

The object of the present invention thus lies in at least partially alleviating the disadvantages of the prior art and in specifying a track roller assembly which is improved in comparison to the prior art.

This object is achieved by a track roller assembly having one or more of the features disclosed herein.

In a track roller assembly it is thus provided according to the invention that the track roller axle body in a fastening position is fastened in a clamping manner in the insertion channels of the track roller suspension by the damping members.

A damped fastening of the track roller in the track roller suspension is thus produced without one or a plurality of clips by a track roller assembly according to the invention, which leads to an improved track roller assembly due to the savings in terms of individual parts.

Therefore, the elastic damping members fulfil a dual function, specifically the previously known damping of vibrations in the track roller assembly, and additionally the fastening of the track roller to the track roller suspension.

In one preferred exemplary embodiment it can be provided that the track roller axle body in the fastening position is fastened in a clamping manner in the insertion channels of the track roller suspension exclusively by the damping members.

In this context, exclusive fastening of the track roller axle body in the insertion channels of the track roller suspension means that the fastening is performed exclusively by the elasticity of the damping members, at least in the form of a form-fit, preferably of a friction-fit.

Additionally, there may also be form-fitting connections between the respective damping member and the track roller suspension. These form-fitting connections can be provided, for example, for stabilizing the position when initiating or holding the fastening position and as a protection against unintentional slippage of the damping members relative to the insertion channels.

A track roller suspension is a device to which the track roller can be fastened or, in other words, from which the latter can be suspended.

In one preferred variant of embodiment it can be provided that the track roller suspension is of an integral design.

In one preferred variant of embodiment it can be provided that the track roller suspension is of an integral design and constructed from a single material.

In one preferred variant of embodiment it can be provided that the track roller suspension has a tensile strength in a range from 50 MPa to 300 MPa, and/or an elasticity modulus in a range from 1500 MPa to 35 000 MPa.

A track roller can have a rim and a running surface. The rim, the running surface and/or other parts of the track roller can be produced from different materials or from a single material.

In one preferred variant of embodiment it can be provided that the track roller is produced from one or a plurality of varieties of plastics materials.

The track roller axle receptacle opening can be formed as a clearance that penetrates the track roller and through which the track roller axle body can be guided.

The track roller axle body is a body with a physical presence. The roller rotation axis can run through the track roller axle body and/or the latter can represent the former per se.

In one preferred variant of embodiment it can be provided that the track roller axle body is a rotationally symmetrical body, particularly preferably a cylindrical body, with a physical presence.

In one preferred variant of embodiment it can be provided that the track roller axle body has a hollow-cylindrical main body, wherein the hollow-cylindrical main body can be closed off by a lid at one end.

In one preferred variant of embodiment it can be provided that the track roller axle body is designed in the form of a pin and/or bolt.

In one preferred variant of embodiment it can be provided that the track roller axle body has a tensile strength in a range from 20 MPa to 300 MPa, and/or an elasticity modulus in a range from 1500 MPa to 35 000 MPa.

Apart from a body having a running surface, the track roller body can also have a bearing for mounting the track roller body to run smoothly on the track roller axle body.

In one preferred variant of embodiment it can be provided that the bearing of the track roller body is a friction bearing or a rolling bearing, preferably a roller bearing or a ball bearing.

One, or both, of the damping members can be constructed from one or a plurality of materials.

In one preferred variant of embodiment it can be provided that one of the, preferably the, damping members is/are in each case of an integral design.

In one preferred variant of embodiment it can be provided that one of the, preferably the, damping members is/are in each case of an integral design and constructed from a single material.

In one preferred variant of embodiment it can be provided that one of the, preferably the, damping members has/have a tensile strength in a range from 10 MPa to 60 MPa, and/or an elasticity modulus in a range from 50 MPa to 300 MPa, and/or a hardness in the range of 50 Shore A to 64 Shore D.

The insertion channels are structural elements of the track roller suspension that are designed to receive the track roller axle body with the two damping members in a clamping manner.

In one preferred variant of embodiment it can be provided that the insertion channels are in each case designed with a U-shaped cross section.

The fastening position of the track roller assembly is a terminal position which is provided for the normal operation of the track roller assembly and in which the track roller axle body is mounted in the insertion channels of the track roller suspension while using at least two elastic damping members disposed therebetween.

In other words, the fastening position is a terminal position in which the track roller axle body is mounted in insertion channels of the track roller suspension while using at least two elastic damping members disposed therebetween, and wherein preferably the two elastic damping members rest on at least one detent, preferably on two detents, of the track roller suspension.

In one preferred variant of embodiment it can be provided that the track roller assembly has an electrical contact resistance, preferably in a range from 103 to 1012 Ohm.

It can also be provided that the track roller assembly is embodied so as to be electrically isolating.

Plastics material can be provided as materials for the track roller assembly, specifically for the track roller suspension and/or the track roller and/or the track roller axle body and/or the track roller body and/or the damping members, preferably one or a plurality of the following plastics material varieties: polyolefins, polyamide (PA), polyethylene terephthalate (PET), polybutylene terephthalate (PBT), polyether ether ketone (PEEK), poly ketone (PEK), polyphenylene sulfide (PPS), polyoxymethylene (POM).

As a reinforcement of the initial material, preferably of one or a plurality of the above-mentioned plastics materials, reinforcement materials can be provided for the track roller assembly, specifically for the track roller suspension and/or the track roller and/or the track roller axle body and/or the track roller body and/or the damping members. One or a plurality of the following materials can be provided as reinforcement materials: glass, carbon, aramid, basalt.

Reinforcement materials can be provided in the form of reinforcement fibers, preferably carbon fibers, in the basic material of the track roller assembly, with a proportion in the range from 5% to 60% by mass, and/or with a fiber length in the range from 0.1 mm to 15 mm.

Carbon fibers can also be referred to as carbon-material fibers.

The track roller assembly as a whole or in part, specifically the track roller suspension and/or the track roller and/or the track roller axle body and/or the track roller body and/or the damping members, can preferably be composed of plastics material, wherein the plastics material comprises electrically conducting fibers, preferably carbon fibers.

An antistatic effect prevents static charging, in particular due to the track roller assembly rolling on different running tracks. A content of other electrically conductive fibers and/or particles, and/or an electrically conducting coating, could also be provided for antistatic purposes.

In order to improve friction bearings such as, for example, a pivot friction bearing of the track roller assembly, an incorporated lubricant, thus a lubricant which is incorporated into or disposed in the material of the respective component, may be provided. As an incorporated lubricant for the track roller assembly, specifically for the track roller suspension and/or the track roller and/or the track roller axle body and/or the track roller body and/or the damping members, one or a plurality of the following materials can be provided: polytetrafluoroethylene (PTFE), high-density polyethylene (HDPE), ultra-high molecular weight polyethylene (UHMWPE), perfluoropolyether (PFPE), molybdenum disulfide ($MoS_2$), graphite, siloxane, oil.

Incorporated lubricants may be provided in the form of filler particles in the material of the track roller assembly, with a proportion in the range from 0.2% to 30% by mass.

For the sake of completeness, it is pointed out that the numerals used in the context of the description of this invention, such as one, two, three and the like, fundamentally describe only the minimum quantity of a feature of the track roller assembly according to the invention that is present. Individual features or constituent parts may of course also be present in larger number. Track roller assemblies according to the invention can thus have, for example, more than one track roller, more than two damping members, etc. In this context, the numeral one for example is therefore to be understood to mean at least one, etc., if and when appropriate.

Further advantageous embodiments of the assembly are defined in the description and claims.

According to one preferred embodiment of the track roller assembly it is provided that the track roller axle body is able to be introduced into the insertion channels of the track roller suspension and removed therefrom by elastic deformation of at least one of the damping members.

According to one preferred embodiment of the track roller assembly it is provided that the track roller axle body is able to be introduced into the insertion channels of the track roller suspension and removed therefrom by elastic deformation of the damping members.

According to one preferred embodiment of the track roller assembly it is provided that the track roller axle body is harder than at least one of the damping members.

According to one preferred embodiment of the track roller assembly it is provided that the track roller axle body is harder than the damping members.

In one preferred variant of embodiment it can be provided that the track roller axle body has a tensile strength which is greater than the tensile strength of one of the, preferably the, damping members by a factor of two to five, and/or an elasticity modulus which is greater than the elasticity modulus of one of the, preferably the, damping members by a factor of two to 30.

According to one preferred embodiment of the track roller assembly it is provided that at least one of the damping members in the fastening position bears directly on at least one wall of the track roller suspension that delimits one of the insertion channels.

According to one preferred embodiment of the track roller assembly it is provided that the damping members in the fastening position bear in each case directly on at least one wall of the track roller suspension that delimits one of the insertion channels.

According to one preferred embodiment of the track roller assembly it is provided that at least one of the damping members is designed as a cap which is attached to an end of the track roller axle body, so as to be preferably removable in a non-destructible manner.

According to one preferred embodiment of the track roller assembly it is provided that the damping members are designed as caps which are in each case attached to an end of the track roller axle body, so as to be preferably removable in a non-destructible manner.

In another variant of embodiment it can be provided that at least one of the, preferably the, damping members is/are designed as a cap or caps, which is/are attached to an end of the track roller axle body, preferably so as to be non-removable, preferably injected thereon by a molding method.

According to one preferred embodiment of the track roller assembly it is provided that at least one of the damping members in the fastening position, in addition to the clamping fastening, forms a latching connection to at least one wall of the track roller suspension that delimits one of the insertion channels.

According to one preferred embodiment of the track roller assembly it is provided that the damping members in the fastening position, in addition to the clamping fastening, form in each case a latching connection to at least one wall of the track roller suspension that delimits one of the insertion channels.

In the case of a latching connection, the parts to be connected can be aligned to match one another by a form-fit and releasably fixed in a form-fitting manner by a spring force. Latching connections of this type are known in a wide range of embodiments, wherein the following one represents a particularly preferable variant of embodiment.

According to one preferred embodiment of the track roller assembly it is provided that the latching connection has a latching connection protrusion as a first latching connection element, and a latching connection receptacle, into which the latching connection protrusion is able to be elastically latched, as a second latching connection element, wherein one of the latching connection elements is formed on one of the damping members, and the other of the latching connection elements is formed on a wall of the track roller suspension that delimits one of the insertion channels.

According to one preferred embodiment of the track roller assembly it is provided that the respective latching connection has a latching connection protrusion as a first latching connection element, and a latching connection receptacle, into which the latching connection protrusion is able to be elastically latched, as a second latching connection element, wherein one of the latching connection elements is formed on one of the damping members, and the other of the latching connection elements is formed on a wall of the track roller suspension that delimits one of the insertion channels.

In one preferred variant of embodiment it can be provided that the latching connection protrusion and/or the latching connection receptacle are/is formed on and/or in the track roller suspension.

In one preferred variant of embodiment it can be provided that the latching connection protrusion and/or the latching connection receptacle are/is inherently elastic and/or elastically mounted, preferably so as to be radiused. The latching connection protrusion can be formed as a stud.

According to one preferred embodiment of the track roller assembly it is provided that the insertion channels are in each case formed in an elongate manner between an introduction opening, which in an operating position of the track roller assembly preferably points downward, for introducing the respective damping member and a detent for the respective damping member, wherein the respective damping member in the fastening position bears on the respective detent.

The operating position of the track roller assembly is the position which the track roller assembly assumes during the intended use.

It is also conceivable that the insertion channels are constructed differently to the exemplary embodiments illustrated hereunder, so that a track roller is not inserted into the insertion channels parallel to the pivot axis of the track roller suspension but instead is introduced orthogonally to the pivot axis of the track roller suspension. In the operating position of the track roller assembly, the insertion channels can extend as well as horizontally when running on a horizontal hard surface. Reference in terms of this variant of embodiment is made to AT 520732 A4.

In one preferred variant of embodiment it can be provided that in the fastening position the respective damping member bears, by way of half of its circumference, preferably by way of 180° of its circumference, on a detent of the track roller suspension. These detents of the track roller suspension can delimit the respective insertion channels.

According to one preferred embodiment of the track roller assembly it is provided that at least one of the damping members has a projecting collar, and at least one wall of the track roller suspension that delimits one of the insertion channels has a collar receptacle channel for receiving the collar.

According to one preferred embodiment of the track roller assembly it is provided that the damping members have in each case a projecting collar, and at least one respective wall of the track roller suspension that delimits a respective one of the insertion channels has a collar receptacle channel for receiving the collar.

In one preferred variant of embodiment it can be provided that the collar receptacle channel for receiving the collar represents a groove and, conjointly with the projecting collar of the at least one damping member introduced into an insertion channel, forms a form-fitting connection.

In one preferred variant of embodiment it can be provided that at least one of the, preferably the, damping members have/has a cylindrical main body, wherein the main body is preferably a hollow cylinder and is closed off by a lid at one end, wherein the lid particularly preferably has the projecting collar and/or a latching connection protrusion and/or a latching connection receptacle.

In one preferred variant of embodiment it can be provided that the collar receptacle channel has an at least partially elongate groove, wherein the groove of the collar receptacle channel extends from the introduction opening to the detent.

According to one preferred embodiment of the track roller assembly it is provided that the track roller suspension is designed as a fork having two fork arms, wherein one of the insertion channels is formed in each of the fork arms, and/or that the track roller suspension is able to be mounted, or is mounted, so as to be pivotable about a pivot axis that preferably runs orthogonally to the track roller axle body.

In one preferred variant of embodiment it can be provided that the fork is of an integral design.

In one preferred variant of embodiment it can be provided that the fork is of an integral design and constructed from a single material.

In one preferred variant of embodiment it can be provided that a pivot bearing is provided in and/or on the track roller suspension, wherein the track roller assembly is connected, or able to be connected, by the pivot bearing, to a conveyor installation such as, for example, a cart or a cart assembly, and the track roller suspension is able to be mounted, or is mounted, so as to be pivotable about a pivot axis of the pivot bearing that preferably runs orthogonally to the track roller axle body.

The pivot bearing can be embodied as a pivot friction bearing or as a pivot rolling bearing, preferably as a pivot ball bearing or pivot roller bearing.

In one preferred variant of embodiment it can be provided that the pivot bearing is designed as a constituent part of the track roller suspension, thus in other words directly as a sub-region of the track roller suspension. Alternatively, the pivot bearing can be manufactured as a separate component and then installed in the track roller suspension.

As a result of the use of a pivot bearing in the form of a pivot friction bearing, two sliding surfaces can slide along one another with the lowest possible coefficients of friction.

In one preferred variant of embodiment it can be provided that one of the sliding surfaces comprises metal, preferably steel, or is composed of metal, preferably steel, and the other of the sliding surfaces comprises plastics material or is composed thereof.

In one preferred variant of embodiment it can be provided that the sliding surfaces and/or the pivot friction bearing and/or an entire component of the track roller assembly and/or the entire track roller assembly has an incorporated lubrication.

For example, fluoropolymers, polyolefins, silicones, sulfides such as $MoS_2$, graphite in various forms, siloxanes or oils can be used as incorporated lubricants in the pivot friction bearing. The incorporated lubricants can be embedded directly in the material of the track roller suspension.

BRIEF DESCRIPTION OF THE DRAWINGS

Further details and advantages of preferred design embodiments of the invention will be explained in more detail below by the description of the figures with reference to the drawings, in which.

DETAILED DESCRIPTION

Figure 1:
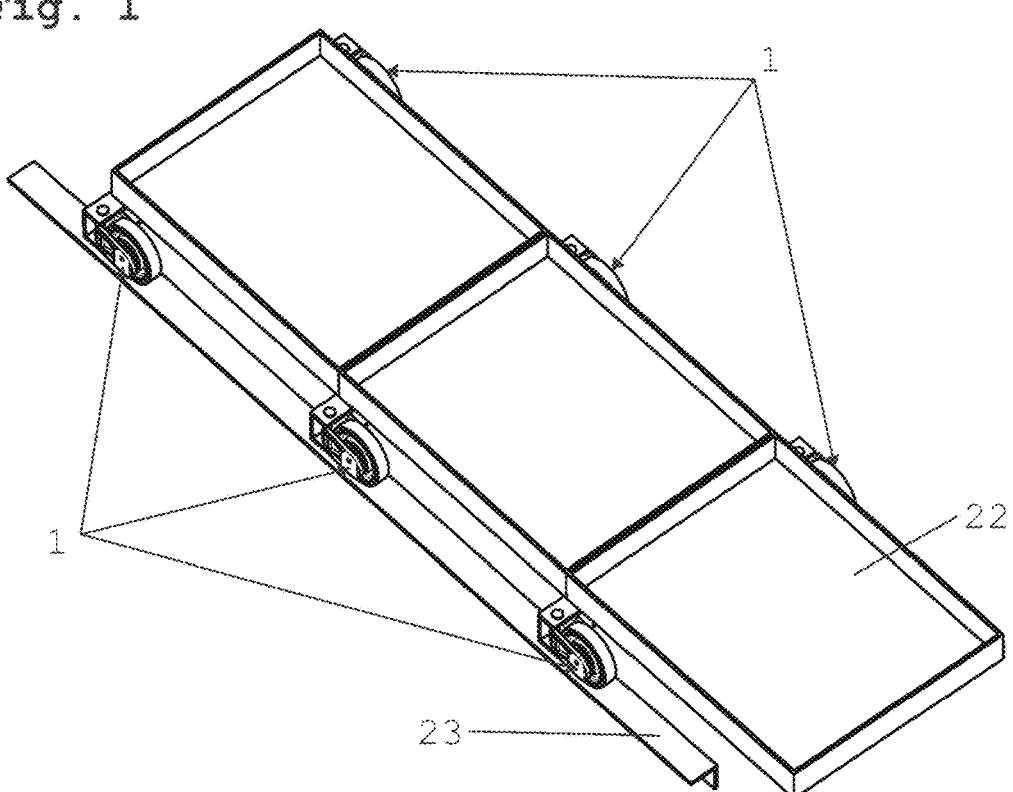
FIG. 1: shows a perspective view of a conveyor installation having six track roller assemblies according to the invention.

FIG. 1 shows a perspective view of a conveyor installation 22 in the form of a cart having six track roller assemblies 1 according to the invention.

A conveyor installation 22 can have three container regions, as shown by way of example herein, wherein each of the container regions can be provided with a track roller assembly 1 on both sides.

As a result of the track roller assembly 1, the conveyor installation 22 can be moved, preferably rolled, in at least one direction on the running track 23.

Figure 2:
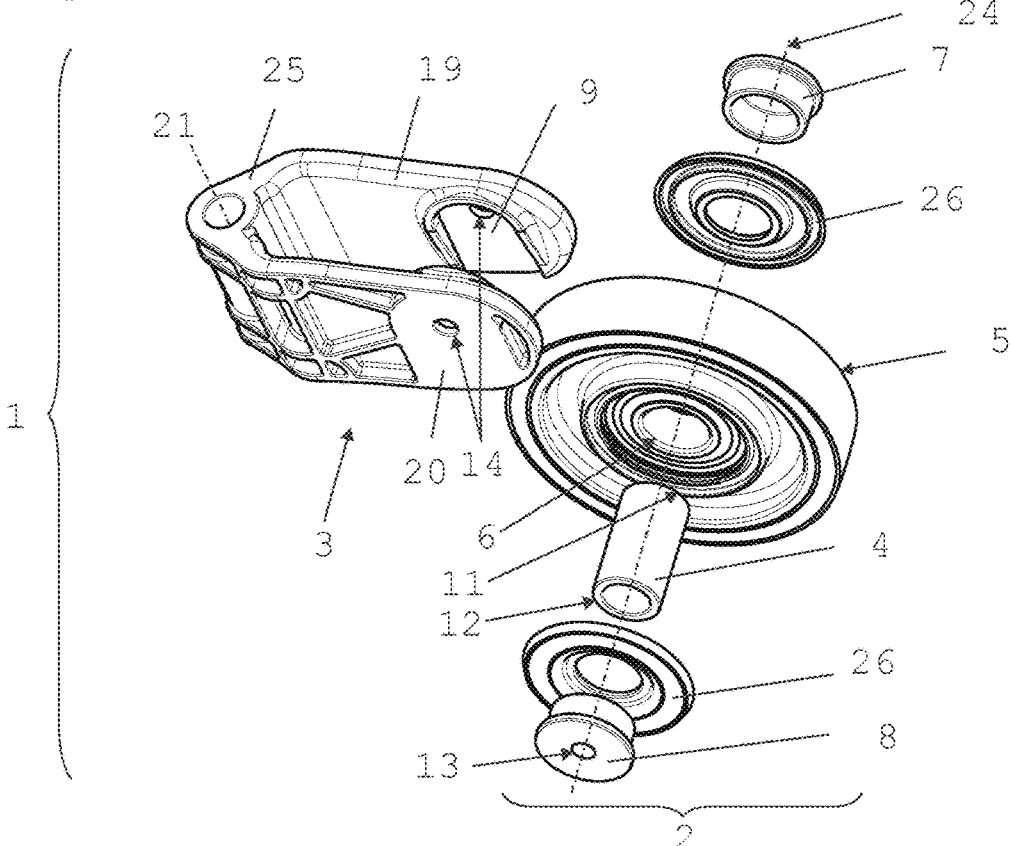
FIG. 2: shows a perspective exploded illustration of an exemplary embodiment of a track roller assembly according to the invention.

FIG. 2 shows a perspective exploded illustration of an exemplary embodiment of a track roller assembly 1 according to the invention.

As can be seen in FIG. 2, the track roller assembly 1 comprises a track roller 2 and a track roller suspension 3, the track roller 2 having a track roller axle body 4 and a track roller body 5 having a track roller axle receptacle opening 6, and the track roller body 5 being rotatably mounted on the track roller axle body 4 which is guided through the track roller axle receptacle opening 6, the track roller axle body 4 being mounted in insertion channels 9, 10 of the track roller suspension 3 while using at least two elastic damping members 7, 8 disposed therebetween, wherein the track roller axle body 4 in a fastening position is fastened in a clamping manner in the insertion channels 9, 10 of the track roller suspension 3 by the damping members 7, 8.

The track roller suspension 3 in FIG. 2 is integrally embodied, represents a fork in this exemplary embodiment, and accordingly has a first fork arm 19, a second fork arm 20, as well as a fork bowl 25 connecting the fork arms 19, 20.

The first insertion channel 9 and the second insertion channel 10 are located on the inside of the first fork arm 19 and of the second fork arm 20, wherein only the first insertion channel 9 can be seen in FIG. 2.

As illustrated in FIG. 2, the insertion channels 9, 10 can have an introduction opening 15 which is disposed on the lower periphery of the respective fork arm 19, 20 and through which the track roller 2 can be introduced, preferably from bottom to top, parallel to the pivot axis 21, by the damping members 7, 8.

As illustrated in FIG. 2, the fork bowl 25 can have a pivot axis 21 which preferably runs orthogonally to the track roller axle body 4 and about which the track roller suspension 3 is able to be, or is, pivotably mounted. The fork bowl 25 thus has a pivot friction bearing for this pivot axis 21, wherein the pivot friction bearing is an integral constituent part of the track roller suspension 3, as illustrated in the exemplary embodiment in FIG. 2.

As illustrated in FIG. 2, the track roller 2 can have a track roller body 5, a track roller axle body 4, a cover 26 for each of the two end sides of the track roller body 5, and a first damping member 7 as well as a second damping member 8 for in each case one end side of the track roller axle body 4.

The track roller body 5 has the track roller axle receptacle opening 6 that forms a continuous hole in the center of the track roller body 5, through which the track roller axle body 4 can be guided.

The track roller axle body 4 can be a cylindrical component which has a first end 11 and a second end 12, wherein one of the damping members 7, 8 is in each case preferably disposed on one of the ends 11, 12.

FIGS. 3 to 7 show various views and illustrations of the track roller assembly 1 from FIG. 2.

Figure 3:
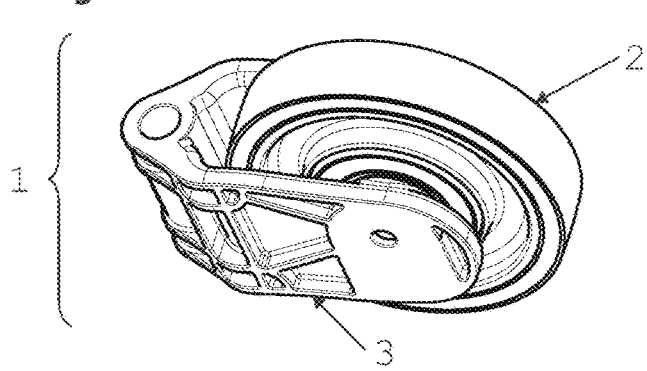
FIGS. 3 to 7: show various views and illustrations of the track roller assembly from FIG. 2.

FIG. 3 shows a perspective view of the track roller assembly 1 in the fastening position.

Figure 4:
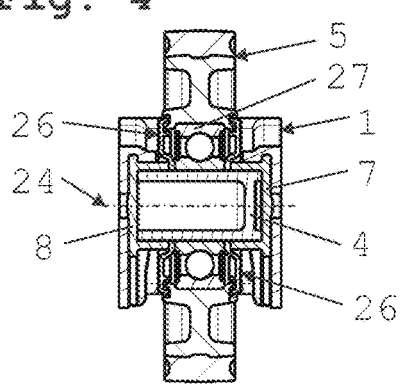

FIG. 4 shows a sectional illustration of the track roller assembly 1 in the fastening position from FIG. 3, wherein the section plane runs through the center of the track roller 2, so as to be parallel to the pivot axis 21 and parallel to the roller rotation axis 24.

Figure 5:
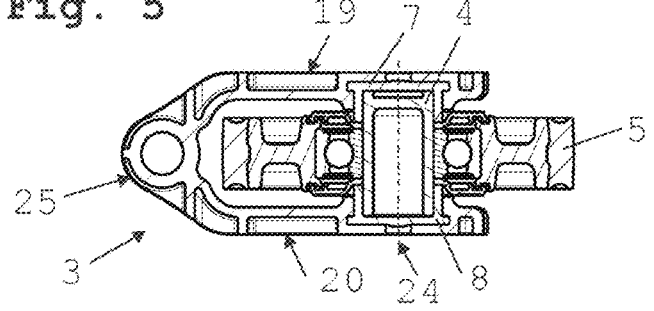

FIG. 5 shows a sectional illustration of the track roller assembly 1 in the fastening position from FIG. 3, wherein the section plane runs through the center of the track roller 2, so as to be orthogonal to the pivot axis 21 and parallel to the roller rotation axis 24.

It can be readily seen in FIGS. 3 to 5 that the track roller 2 is connected to the track roller suspension 3 while using the first damping member 7 and the second damping member 8 disposed therebetween. In the position illustrated, the track roller 2 is located between the fork arms 19 and 20 of the track roller suspension 3, wherein the damping members 7, 8, proceeding from the introduction openings 15 of the first insertion channel 9 and of the second insertion channel 10, are introduced along the insert channels 9, 10 up to the detent 16, preferably up to the detents 16, of the insertion channels 9, 10. The position illustrated corresponds to the fastening position of the track roller assembly 1.

When the insertion channels 9, 10, in addition to the fastening position in this exemplary embodiment illustrated, point downward, for example when the track roller assembly 1 is disposed below a conveyor installation 22, the track roller assembly 1 in this exemplary embodiment is also located in the operating position. The operating position can also be identified in FIG. 1.

The detents 16 of the insertion channels 9, 10 can be embodied in the form of a semicircular ending of the insertion channels 9, 10.

Figure 6:
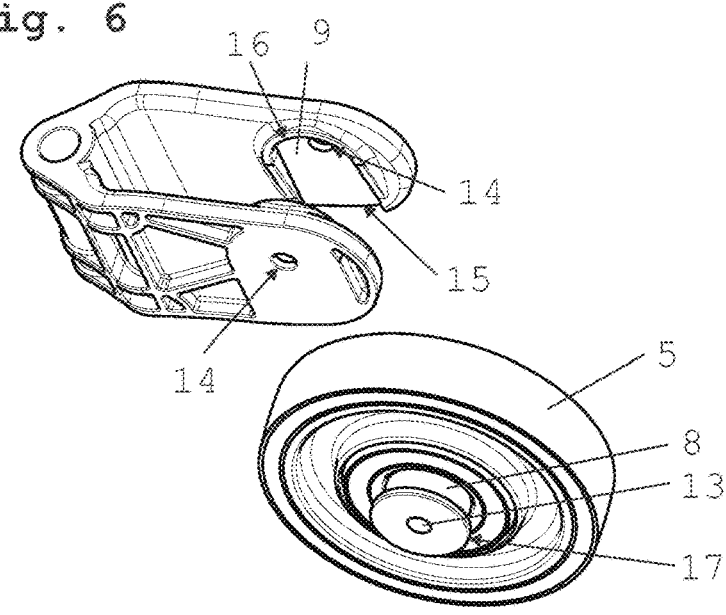
Figure 7:
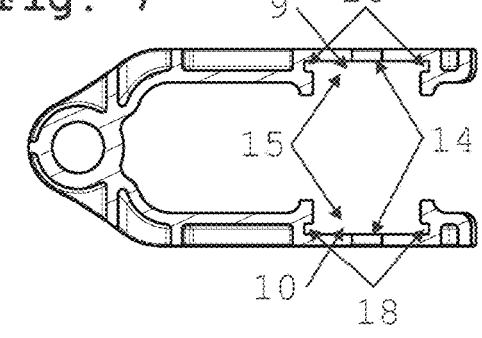
Figure 7:
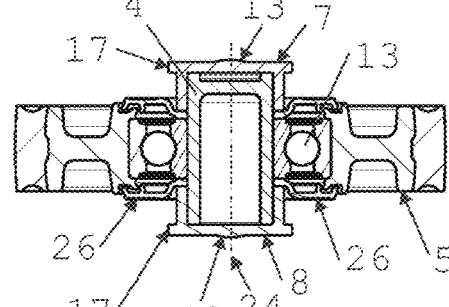

As can be seen particularly well in FIGS. 6 and 7, the first insertion channel 9 and the second insertion channel 10 have in each case one introduction opening 15.

The first insertion channel 9 and/or the second insertion channel 10 can be provided, preferably combined, with at least one collar receptacle channel 18 so as to guide the at least one collar 17 of the first damping member 7 and/or of the second damping member 8 along the first insertion channel 9 and/or the second insertion channel 10 up to the fastening position, and to be able to firmly hold said at least one collar 17 there by a form-fit.

As can be seen in FIGS. 3 to 7, it can be provided that the collar receptacle channel 18 of one of the two insertion channels 9, 10 forms in each case one detent 16 by way of a semicircular profile on the end of the respective insertion channel 9, 10.

The track roller axle body 4, and thus the track roller 2, in the fastening position are fastened to the track roller suspension 3 in a clamping manner preferably exclusively by the damping members 7 and 8. For this purpose, the damping members 7 and 8 are favorably elastically deformed when being introduced into the respective insertion channels 9 and 10. In a simple embodiment, this type of clamping fastening can even be based solely on a friction-fit.

However, in the exemplary embodiment shown here it is provided in addition to the friction-fit that, in the fastening position of the track roller assembly 1, at least one latching connection protrusion 13 of the first damping member 7 and/or of the second damping member 8 is latched in at least one latching connection receptacle 14 of the first fork arm 19 and/or of the second fork arm 20. In this way, it can be guaranteed that the track roller assembly 1 remains in the fastening position, preferably in a form-fitting manner in addition to the clamping fastening, and/or slipping of the damping members is avoided. In this exemplary embodiment, the engagement of the damping members 7 and 8 in the respective insertion channels 9 and 10, and also the detents 16, ensure an additional form-fitting fastening of the track roller axle body 4, and thus of the track roller 2, to the track roller suspension 3 in the fastening position.

FIG. 6 shows a perspective illustration of the track roller assembly 1, wherein the track roller 2 is not located in the fastening position.

FIG. 7 shows a sectional illustration of the track roller assembly 1, wherein the track roller 2 is likewise not located in the fastening position. The section plane herein runs through the roller rotation axis 24 of the track roller axle body 4 of the track roller 2, orthogonally to the pivot axis 21 and parallel to the roller rotation axis 24.

FIGS. 8 to 14 show various views of the track roller 2 of the track roller assembly 1 from FIG. 2 with or without damping members 7, 8.

Figure 8:
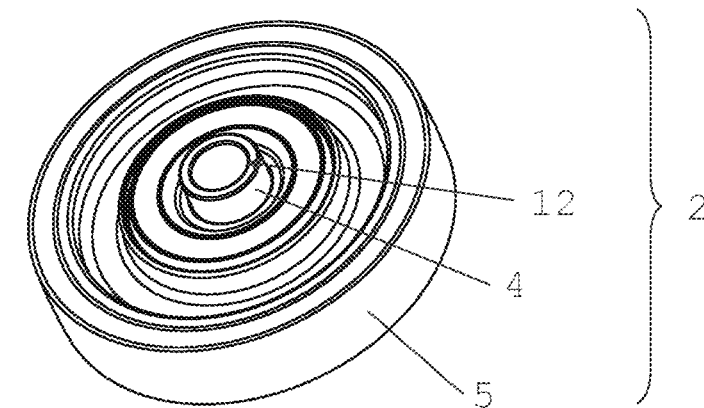
FIGS. 8 to 14: show various views of the track roller of the track roller assembly from FIG. 2 with or without damping members.

FIG. 8 shows a perspective view of the track roller 2 including the track roller body 5 and the track roller axle body 4, without the damping members 7 and 8.

Figure 9:
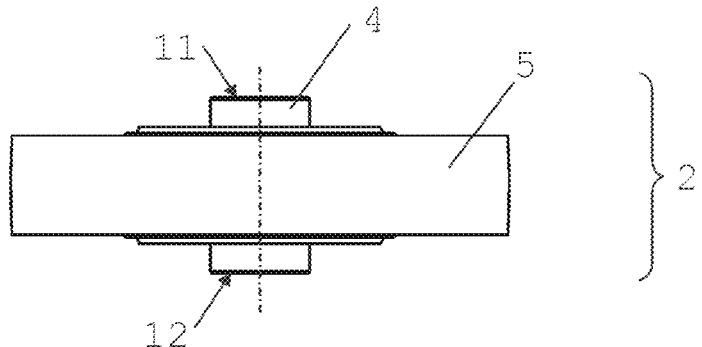

FIG. 9 shows a plan view of the track roller 2 from FIG. 8.

Figure 10:
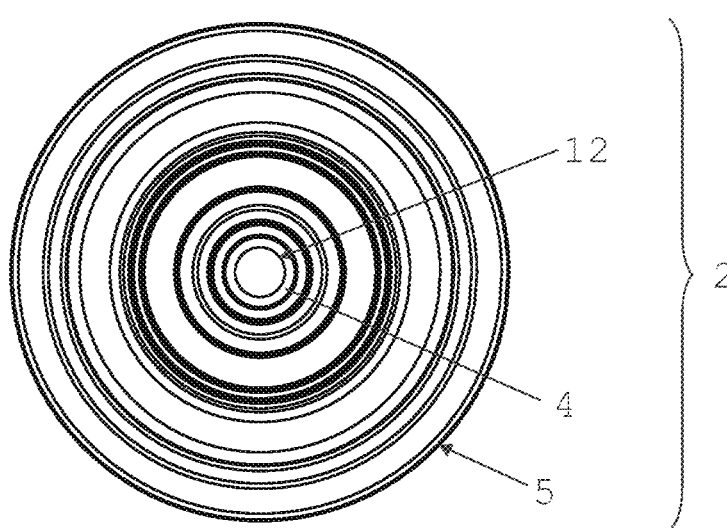

FIG. 10 shows a front view of the track roller 2 from FIG. 8.

Figure 11:
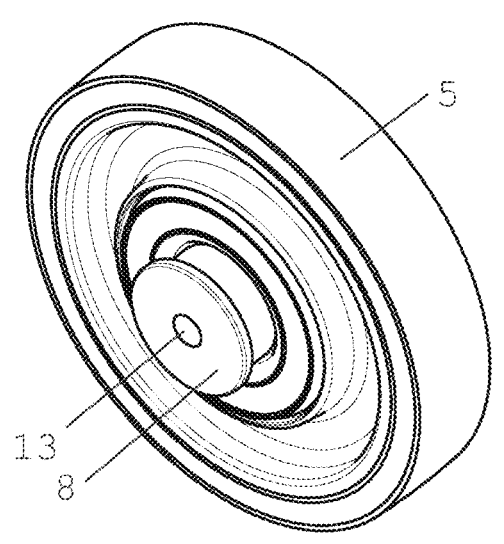

FIG. 11 shows a perspective view of the track roller 2 including the track roller body 5, the track roller axle body 4, and the two damping members 7, 8, wherein only the first damping member 8 can be seen.

Figure 12:
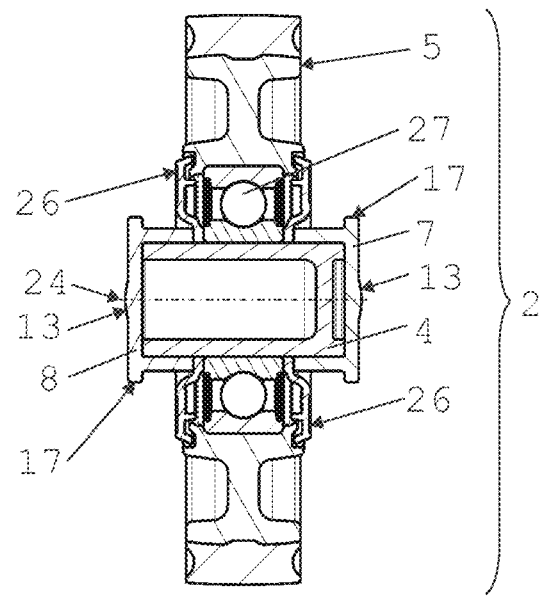

FIG. 12 shows a sectional illustration of the track roller 2 from FIG. 11, wherein the section plane runs through the roller rotation axis 24.

Figure 13:
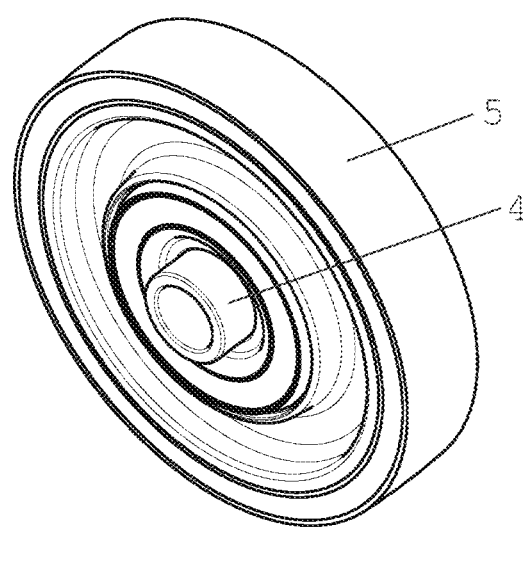

FIG. 13 shows a perspective view of the track roller 2 including the track roller body 5 and the track roller axle body 4, wherein neither of the two damping members 7, 8 is illustrated, as opposed to FIG. 11.

Figure 14:
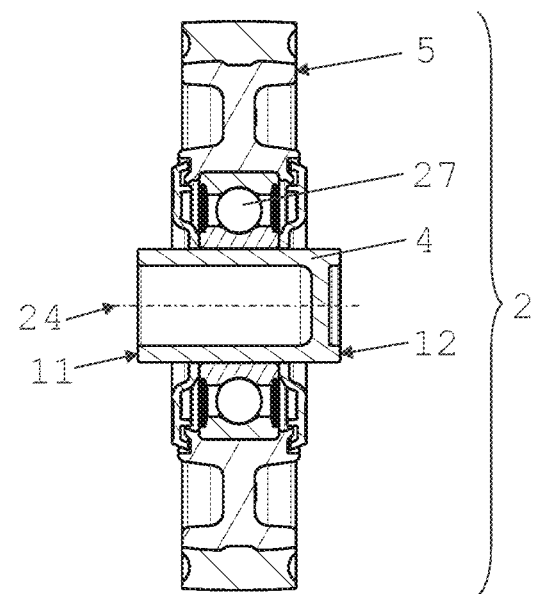

FIG. 14 shows a sectional illustration of the track roller 2 from FIG. 13, wherein the section plane runs through the roller rotation axis 24.

It can be seen in FIGS. 13 and 14 that the track roller axle body 4 can be a hollow-cylindrical component having a closed-off end and an open end, wherein the open end can be seen in FIG. 13.

A bearing of the track roller 2 can be seen particularly well in FIGS. 4, 5, 7, 12 and 14. The bearing can be a friction bearing which is embodied as a separate component or as an integrated constituent part of the track roller 2, or a rolling bearing 27, specifically a ball bearing, as illustrated here in this exemplary embodiment.

The rolling bearing 27 illustrated, as part of the track roller 2, connects the track roller body 5 to the track roller axle body 4 and transmits forces, preferably compressive forces, between these two components, wherein the roller friction during rotation of the track roller body 5 about the roller rotation axis 24 is simultaneously reduced.

In order to protect the rolling bearing 27 from external influences such as contamination or mechanical effects, covers 26 are provided on both end sides of the track roller 2 so that the rolling bearing 27 is shielded, preferably completely, in relation to the outside.

FIGS. 15 to 20 show in each case a non-sectional lateral view and a sectional lateral view of three exemplary embodiment for linking a track roller assembly 1 to a fitting 28 of a conveyor installation 22.

Figure 15:
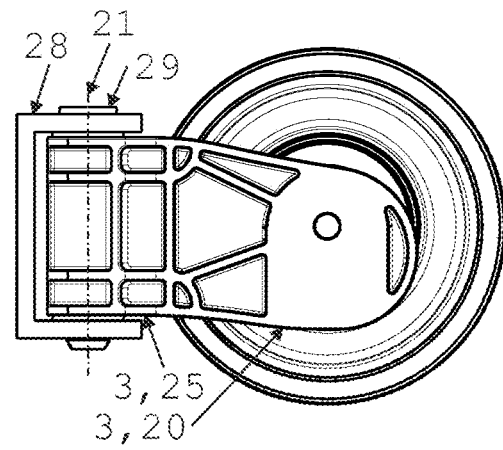
FIGS. 15 to 20: show in each case a non-sectional lateral view and a sectional view of three exemplary embodiments for linking a track roller assembly to a fitting.
Figure 16:
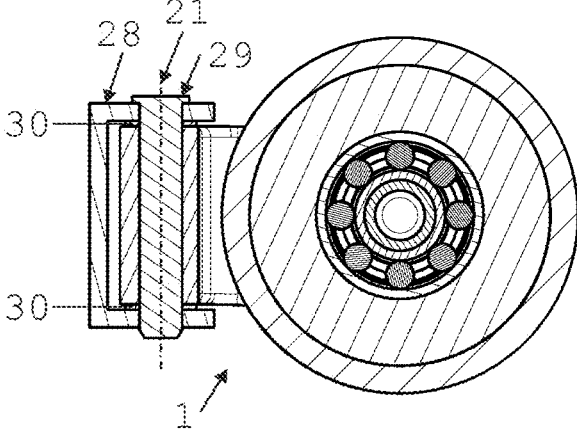
Figure 17:
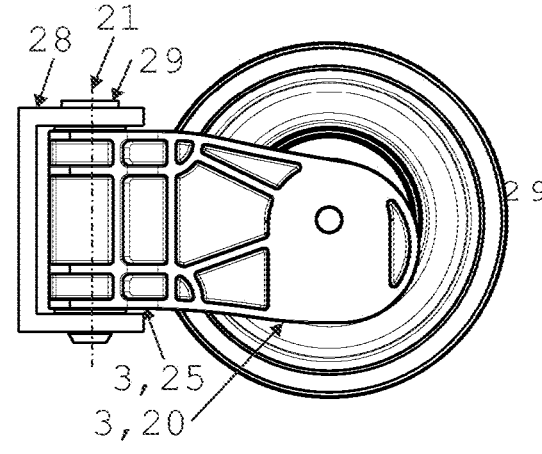
Figure 18:
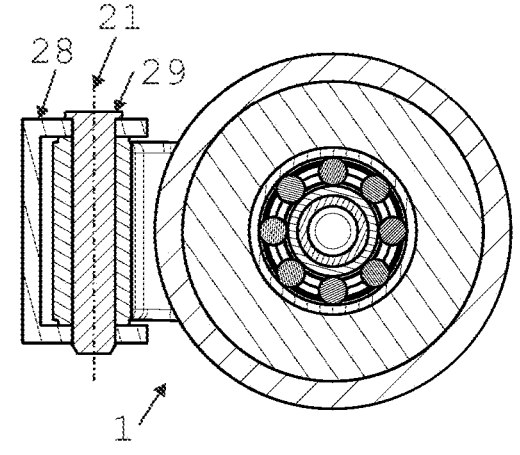
Figure 19:
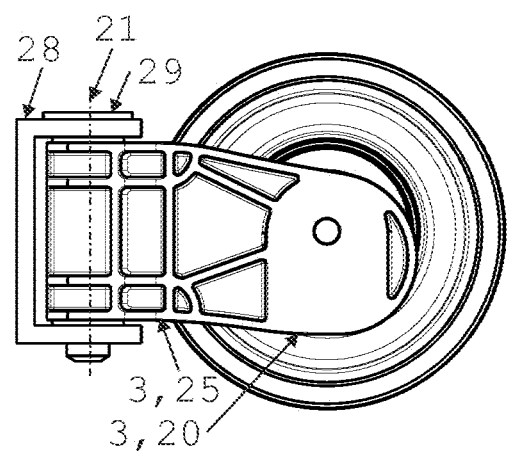

FIGS. 15 and 16 show a first exemplary embodiment of a linking of a track roller assembly 1 to a fitting 28 by a pin 29. Here a washer 30 is in each case disposed between the fork bowl 25 of the track roller assembly 1 and the fitting 28 on the upper side as well as on the lower side of the track roller suspension 3.

Forces can be transmitted between the fitting 28 and the pivot friction bearing of the track roller assembly 1 by way of the pin 29 and the washers 30. A pivotable mounting of the track roller assembly 1 is provided in this way.

Therefore, sliding occurs between the washers 30 as well as the pin 29 and the track roller suspension 3 in this first exemplary embodiment.

As opposed to the first exemplary embodiment from FIGS. 15 and 16, FIGS. 17 and 18 show linking of the track roller assembly 1 to the fitting 28 without intervening washers 30. Instead of the washers 30 from FIGS. 15 and 16, the fork bowl 25 of the track roller suspension 3 in this second exemplary embodiment has in each case a low protrusion on the upper side and the lower side of the track roller suspension 3.

Therefore, sliding occurs between the fitting 28 as well as the pin 29 and the protrusions of the track roller suspension 3 in this second exemplary embodiment.

As opposed to the first and second exemplary embodiments from FIGS. 15 to 18, FIGS. 19 and 20 show linking of the track roller assembly 1 to the fitting 28 with a washer 30 which is disposed on the lower side of the track roller suspension 3. The washer from FIGS. 15 and 16, which is disposed on the upper side of the track roller suspension 3, and the protrusion from FIGS. 17 and 18, which is disposed on the upper side of the track roller suspension 3, have been replaced by a correspondingly constructed pin head of the pin 29. The pin head of the pin 29 and the fitting 28 here are constructed in such a manner that the pin 29 enables the track roller assembly 1 to be linked to the fitting, and also provides a contact face for the upper side of the track roller suspension 3.

Therefore, sliding occurs between the pin 29, in particular the pin head, as well as between the washer 30 and the track roller suspension 3 in this third exemplary embodiment.

Figure 20:
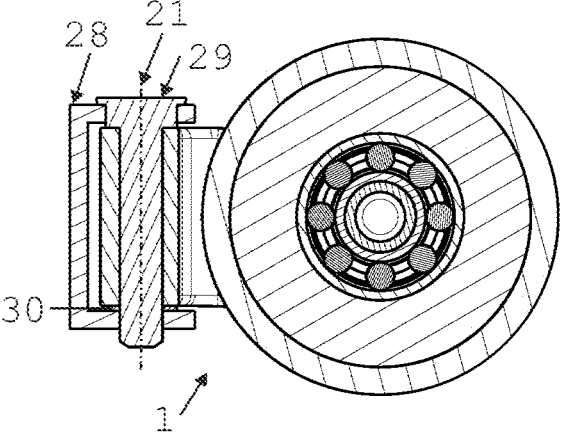

The exemplary embodiments illustrated are not to be understood to be limiting but can be combined with one another, depending on the requirements. Thus, it is conceivable, for example, that in an exemplary embodiment washers 30 are combined with protrusions of the track roller suspension 3, or in other words washers 30 bear on protrusions of the track roller suspension 3. It can also be provided that the pin 29 bears on a washer 30 or directly on the track roller suspension 3 by a wide pin head, as illustrated in FIG. 20, or a band which is spaced apart from the pin head.

As has already been discussed, it can be provided in the exemplary embodiments illustrated that one of the sliding surfaces, preferably of the pin 29 and/or of the fitting 28, comprises metal, preferably steel or aluminum, or is composed of metal, preferably steel, and the other of the sliding surfaces, preferably of the track roller suspension 3, comprises plastics material or is composed of plastics material.

In one preferred variant of embodiment, at least one of the sliding surfaces can be part of a fitting 28 of a conveyor installation 22 and/or part of a pin 29, and another sliding surface can be part of the track roller assembly 1, preferably of the track roller suspension 3.

As has already been discussed, it can be provided in the exemplary embodiments illustrated that the sliding surfaces and/or the pivot bearing, preferably the pivot friction bearing, of the track roller suspension 3, and/or part of the track roller assembly, preferably the track roller suspension 3, and/or the entire track roller assembly 1, has an incorporated lubrication.

For a particularly favorable coefficient of friction it can be provided that sliding in the context of the pivoting of the track roller assembly 1 is carried out by the pivot friction bearing between at least one sliding surface of metal and at least one sliding surface of plastics material, preferably of plastics material with incorporated lubricants.

The pivot bearing, preferably the pivot friction bearing, of the track roller assembly 1, and/or the track roller assembly 1 as a whole, can have a load bearing capability of 1000 N, preferably of 4000 N. Part of the pivot friction bearing is preferably formed directly in the track roller suspension 3, as is also provided in the examples here.

LEGEND FOR THE REFERENCE SIGNS

1 Track roller assembly
2 Track roller
3 Track roller suspension
4 Track roller axle body
5 Track roller body
6 Track roller axle receptacle opening
7 First damping member
8 Second damping member
9 First insertion channel
10 Second insertion channel
11 First end of the track roller axle body
12 Second end of the track roller axle body
13 Latching connection protrusion
14 Latching connection receptacle
15 Introduction opening
16 Detent
17 Collar
18 Collar receptacle channel
19 First fork arm
20 Second fork arm
21 Pivot axis
22 Conveyor installation
23 Running track
24 Roller rotation axis
25 Fork bowl
26 Cover
27 Rolling bearing
28 Fitting
29 Pin
30 Washer

The invention claimed is:

1. A track roller assembly comprising:
a track roller and a track roller suspension;
the track roller having a track roller axle body and a track roller body having a track roller axle receptacle opening, with the track roller body being rotatably mounted on the track roller axle body which is guided through the track roller axle receptacle opening;
the track roller axle body being mounted in insertion channels of the track roller suspension with at least two elastic damping members disposed therebetween; and
the track roller axle body in a fastening position is fastened in a clamping manner in the insertion channels of the track roller suspension by the damping members;
wherein at least one of the damping members in the fastening position, in addition to the clamping fastening, forms a latching connection to at least one wall of the track roller suspension that delimits one of the insertion channels.

2. The track roller assembly as claimed in claim 1, wherein the track roller axle body is introducible into the insertion channels of the track roller suspension and removable therefrom by elastic deformation of at least one of the damping members.

3. The track roller assembly as claimed in claim 1, wherein the track roller axle body is harder than at least one of the damping members.

4. The track roller assembly as claimed in claim 1, wherein at least one of the damping members in the fastening position, bears directly on at least one wall of the track roller suspension that delimits one of the insertion channels.

5. The track roller assembly as claimed in claim 1, wherein at least one of the damping members comprises a cap which is attached to an end of the track roller axle body to be non-destructibly removable.

6. The track roller assembly as claimed in claim 1, wherein the latching connection has a latching connection protrusion as a first latching connection element, and a latching connection receptacle, into which the latching connection protrusion is able to be elastically latched, as a second latching connection element, and one of the latching connection elements is formed on one of the damping members, and the other of the latching connection elements is formed on a wall of the track roller suspension that delimits one of the insertion channels.

7. The track roller assembly as claimed in claim 1, wherein the track roller suspension comprises a fork having two fork arms, and one of the insertion channels is formed in each of the fork arms.

8. The track roller assembly as claimed in claim 1, wherein the track roller suspension is mountable, or is mounted, so as to be pivotable about a pivot axis that runs orthogonally to the track roller axle body.

9. A track roller assembly comprising:

a track roller and a track roller suspension;

the track roller having a track roller axle body and a track roller body having a track roller axle receptacle opening, with the track roller body being rotatably mounted on the track roller axle body which is guided through the track roller axle receptacle opening;

the track roller axle body being mounted in insertion channels of the track roller suspension with at least two elastic damping members disposed therebetween; and the track roller axle body in a fastening position is fastened in a clamping manner in the insertion channels of the track roller suspension by the damping members;

wherein the insertion channels are in each case elongate and extend between an introduction opening, which in an operating position of the track roller assembly points downward, for introducing the respective damping member, and a detent for the respective damping member, and the respective damping member in the fastening position bears on the respective detent.

10. A track roller assembly comprising:

a track roller and a track roller suspension;

the track roller having a track roller axle body and a track roller body having a track roller axle receptacle opening, with the track roller body being rotatably mounted on the track roller axle body which is guided through the track roller axle receptacle opening;

the track roller axle body being mounted in insertion channels of the track roller suspension with at least two elastic damping members disposed therebetween; and the track roller axle body in a fastening position is fastened in a clamping manner in the insertion channels of the track roller suspension by the damping members;

wherein at least one of the damping members has a projecting collar, and at least one wall of the track roller suspension that delimits one of the insertion channels has a collar receptacle channel for receiving the collar.

* * * * *